United States Patent [11] 3,621,209

[72] Inventor Peter A. Businger
Madison, N.J.
[21] Appl. No. 885,049
[22] Filed Dec. 15, 1969
[45] Patented Nov. 16, 1971
[73] Assignee Bell Telephone Laboratories, Incorporated
Murray Hill, Berkeley Heights, N.J.

[54] MACHINE-IMPLEMENTED PROCESS FOR INSURING THE NUMERICAL STABILITY OF GAUSSIAN ELIMINATION
10 Claims, 3 Drawing Figs.

[52] U.S. Cl. 235/150
[51] Int. Cl. G06f 15/32
[50] Field of Search 235/150

[56] References Cited

OTHER REFERENCES

Algorithm 231 Matrix Inversion; J. Boothroyd; Communications of the ACM; Vol. 7, No. 6, June 1964.

*Primary Examiner*—Malcolm A. Morrison
*Assistant Examiner*—Edward J. Wise
*Attorneys*—R. J. Guenther and William L. Keefauver

ABSTRACT: A method of insuring the numerical stability of the machine-implemented computational process of Gaussian elimination. The accuracy of the method of complete pivoting is substantially obtained without sacrificing the economy of the method of partial pivoting, except in those cases where it is essential to do so to preserve accuracy.

INVENTOR
P. A. BUSINGER
BY
ATTORNEY

MACHINE-IMPLEMENTED PROCESS FOR INSURING THE NUMERICAL STABILITY OF GAUSSIAN ELIMINATION

BACKGROUND OF THE INVENTION

1. Field of the Invention

This invention relates to machine-implemented processes for performing Gaussian elimination.

2. Description of the Prior Art

It is well known that many physical systems can be characterized mathematically by a linear system of algebraic equations having the form:

$$\begin{aligned} a_{11}x_1+a_{12}x_2+a_{13}x_3+ \ldots +a_{1n}x_n&=k_1 \\ a_{21}x_1+a_{22}x_2+a_{23}x_3+ \ldots +a_{2n}x_n&=k_2 \\ a_{31}x_1+a_{32}x_2+a_{33}x_3+ \ldots +a_{3n}x_n&=k_3 \\ &\vdots \\ a_{n1}x_1+a_{n2}x_2+a_{n3}x_3+ \ldots +a_{nn}x_n&=k_n \end{aligned} \qquad (1)$$

The solution of this system of equations involves the determination of a unique value for each $x_i$.

One method of solution is by using matrix methods. The system (1) may be expressed in matrix notation as $$Ax=k \qquad (2)$$

where $A$ is the matrix formed by the $a_{ij}$ coefficients, $x$ is the column vector of the $x_i$'s, and $k$ is the column vector of the $k_i$'s. The inverse of the matrix A may then be computed and used to premultiply both sides of equation (2). The result will be $$x=y \qquad (3)$$

where $y$ is a column vector containing the values of the respective $x_i$'s. This method of solution is rarely used in hand calculations due to the difficulty of computing the inverse of a matrix. Its machine implementation often overlaps the method of Gaussian elimination, as will be described.

A second method of solution is to use Cramer's rule. In this solution, the determinant $$A=\begin{vmatrix} a_{11} & a_{12} & \ldots & a_{1n} \\ \cdot & & & \\ \cdot & & & \\ \cdot & & & \\ a_{n1} & \ldots & & a_{nn} \end{vmatrix} \qquad (4)$$

is computed. Then each $x_i$ may be found from $$x_i=\frac{A_i}{A} \quad i=1, 2, \ldots ,n \qquad (5)$$

where $A_i$ is the determinant $$A_i=\begin{vmatrix} a_{11} & \ldots & a_{1i-1} & k_1 & a_{1i+1} & \ldots & a_{1n} \\ a_{21} & \ldots & a_{2i-1} & k_2 & a_{2i+1} & \ldots & a_{2n} \\ \cdot & & \cdot & \cdot & \cdot & & \cdot \\ \cdot & & \cdot & \cdot & \cdot & & \cdot \\ a_{n1} & \ldots & a_{ni-1} & k_n & a_{ni+1} & \ldots & a_{nn} \end{vmatrix} \qquad (6)$$

This method is often used in hand calculations but cannot be efficiently adapted to machine computation.

A third method of solution is the Gaussian elimination procedure. This procedure reduces the system of equations (1) to the system (7)

$$\begin{aligned} a_{11}x_1+a_{12}x_2+a_{13}x_3+ \ldots +a_{1n}x_n&=k_1 \\ \hat{a}_{22}x_2+\hat{a}_{23}x_3+ \ldots +\hat{a}_{2n}x_n&=\hat{k}_2 \\ \hat{\hat{a}}_{33}x_3+ \ldots +\hat{\hat{a}}_{3n}x_n&=\hat{\hat{k}}_3 \\ \ldots \quad & \\ \hat{a}_{nn}^{(n-1)}x_n&=\hat{k}_n^{(n-1)} \end{aligned} \qquad (7)$$

This reduction is accomplished by multiplying the first equation of system (1) by $$-a_{21}/a_{11} \qquad (8)$$

and adding it to the second equation of system (1), then multiplying the first equation of system (1) by $$-a_{31}/a_{11} \qquad (9)$$

and adding it to the third equation of system (1), and continuing in an analogous manner until the remaining equations of system (1) have been modified. The entire procedure is repeated $(n-1)$ times, using successive ones of the equations of system (1) as the starting point of each successive iteration. Each iteration of the procedure modifies the coefficients of the equations acted upon, and this is denoted in system (7) by the increasing number of superior carets on the coefficients. As an example, after two iterations, the system of equations (1) would be as follows:

$$\begin{aligned} a_{11}x_1+a_{12}x_2+a_{13}x_3+ \ldots +a_{1n}x_n&=k_1 \\ \hat{a}_{22}x_2+\hat{a}_{23}x_3+ \ldots +\hat{a}_{2n}x_n&=\hat{k}_2 \\ \hat{\hat{a}}_{33}x_3+ \ldots +\hat{\hat{a}}_{3n}x_n&=\hat{\hat{k}}_3 \\ \hat{\hat{a}}_{43}x_3+ \ldots +\hat{\hat{a}}_{4n}x_n&=\hat{\hat{k}}_4 \\ \hat{\hat{a}}_{53}x_3+ \ldots +\hat{\hat{a}}_{5n}x_n&=\hat{\hat{k}}_5 \\ &\vdots \\ \hat{\hat{a}}_{n3}x_3+ \ldots +\hat{\hat{a}}_{nn}x_n&=\hat{\hat{k}}_n \end{aligned} \qquad (10)$$

The next step would be to multiply the third equation of system (10) by $$\frac{-\hat{\hat{a}}_{43}}{\hat{\hat{a}}_{33}} \qquad (11)$$

and add it to the fourth equation of system (10), then multiply the third equation of system (10) by $$\frac{-\hat{\hat{a}}_{53}}{\hat{\hat{a}}_{33}} \qquad (12)$$

and add it to the fifth equation of system (10), and so forth. The result of this third iteration would be the equations of system (13).

$$\begin{aligned} a_{11}x_1+a_{12}x_2+a_{13}x_3+a_{14}x_4+ \ldots &+a_{1n}x_n+k_1 \\ \hat{a}_{22}x_2+\hat{a}_{23}x_3+\hat{a}_{24}x_4+ \ldots +\hat{a}_{2n}x_n&=\hat{k}_2 \\ \hat{\hat{a}}_{33}x_3+\hat{\hat{a}}_{34}x_4+ \ldots +\hat{\hat{a}}_{3n}x_n&=\hat{\hat{k}}_3 \\ \hat{\hat{\hat{a}}}_{44}x_4+ \ldots +\hat{\hat{\hat{a}}}_{4n}x_n&=\hat{\hat{\hat{k}}}_4 \\ \hat{\hat{\hat{a}}}_{54}x_4+ \ldots +\hat{\hat{\hat{a}}}_{5n}x_n&=\hat{\hat{\hat{k}}}_5 \\ &\vdots \\ \hat{\hat{\hat{a}}}_{n4}x_4+ \ldots +\hat{\hat{\hat{a}}}_{nn}x_n&=\hat{\hat{\hat{k}}}_n \end{aligned} \qquad (13)$$

Each iteration results in the elimination of one of the $x_i$'s from each of the equations operated upon. The system (7) is thus produced in $(n-1)$ iterations of the Gaussian elimination procedure. The value of each of the $x_i$'s may then be computed by backward substitution, that is, the last equation of system (7) may easily be solved to evaluate $x_n$. The value of $x_n$ can then be substituted into the second last equation of system (7) to find $x_{11}$. These substitutions can be continued until all of the $x_i$ values have been found.

The general computational applicability of the Gaussian elimination procedure can be more readily appreciated by a consideration of the matrix form of the equations of system (7), as shown by equation (14).

$$\begin{bmatrix} a_{11} & a_{12} & a_{13} & a_{14} & \cdots & a_{1n} \\ 0 & \hat{a}_{22} & \hat{a}_{23} & \hat{a}_{24} & \cdots & \hat{a}_{2n} \\ 0 & 0 & \hat{\hat{a}}_{33} & \hat{\hat{a}}_{34} & \cdots & \hat{\hat{a}}_{3n} \\ 0 & 0 & 0 & \hat{\hat{\hat{a}}}_{44} & \cdots & \hat{\hat{\hat{a}}}_{4n} \\ \cdot & \cdot & \cdot & & & \cdot \\ \cdot & \cdot & \cdot & & & \cdot \\ 0 & 0 & 0 & 0 & \cdots & \hat{a}^{(n-1)} \end{bmatrix} \begin{bmatrix} x_1 \\ x_2 \\ \cdot \\ \cdot \\ \cdot \\ \cdot \\ x_n \end{bmatrix} = \begin{bmatrix} k_1 \\ k_2 \\ k_3 \\ \cdot \\ \cdot \\ \cdot \\ k_n^{(n-1)} \end{bmatrix}. \quad (14)$$

The resulting coefficient matrix is seen to be upper triangular, that is, all of its nonzero values are above the diagonal.

This result provides a technique that is very generally useful in matrix calculations. For example, chapter 9 of the text, *Computer Solution of Linear Algebraic Systems*, by George Forsythe and Cleve B. Moler, Prentice Hall, Inc., 1967, discusses the use of Gaussian elimination in LU decomposition. LU decomposition provides a matrix method of solution of a linear system of equations, such as those shown in matrix form in equation (2), by a recognition of the fact that the matrix A can be decomposed into the product of a lower triangular matrix, L, and an upper triangular matrix, U, by Gaussian elimination. Equation (2) can then be written $$LUx=k \quad (15)$$

This equation may in turn be written as two triangular systems $$Ly=k$$
$$Ux=y \quad (16)$$

each of which may be easily solved by the previously mentioned substitutional process.

Note that in LU decomposition only the A matrix is operated upon, hence the triangularization need not be repeated to solve a system of equations having the same left-hand side but a new right-hand side. This is important in that it allows the Gaussian elimination procedure to be utilized in the aforementioned matrix method of solution of equation (2) involving the calculation of the inverse, $A^{11}$, of the A matrix.

LU decomposition can be applied to calculate the inverse of any matrix A as follows. A system of matrix equations $$\begin{aligned} Ax^1 &= b^1 \\ Ax^2 &= b^2 \\ &\vdots \\ Ax^n &= b^n \end{aligned} \quad (17)$$

can be written in which the $b^j$ vectors are chosen to be all zero except for the values in the $j^{th}$ position, that is;

$$b^1=\begin{bmatrix}1\\0\\0\\\cdot\\\cdot\\\cdot\\0\end{bmatrix};\ b^2=\begin{bmatrix}0\\1\\0\\\cdot\\\cdot\\\cdot\\0\end{bmatrix};\ \ldots\ b^n=\begin{bmatrix}0\\0\\\cdot\\\cdot\\\cdot\\0\\1\end{bmatrix}. \quad (18)$$

Matrix A may then be LU decomposed and each of equations (17) solved for the respective $x^j$ vectors. $A^{11}$ is then simply formed by concatenating the $x^j$ vectors to form a matrix. That is, $$A^{-1}=x^1x^2 \ldots x^n=\begin{bmatrix} x_1^1 & x_1^2 & \cdots & x_1^n \\ x_2^1 & & & \cdot \\ \cdot & & & \cdot \\ \cdot & & & \cdot \\ \cdot & & & \cdot \\ x_n^1 & & \cdots & x_n^n \end{bmatrix}. \quad (19)$$

Thus it is seen that Gaussian elimination is applicable to the more general problem of matrix inversion. Matrix inversion, in turn, is an important procedure often required in the application of matrix methods to physical systems. For example, the applicability of matrix methods to the solution of node and loop equations derived from electrical networks is well known and is described in most elementary electrical engineering texts, as in chapter 10 of *Electrical Engineering Circuits*, by H. H. Skilling, John Wiley and Sons, Inc., 1957. Other examples may be found in the text *Linear Systems Theory* by L. A. Zadeh and C. A. Desoer, McGraw-Hill, 1963, which deals entirely with the application of state variable techniques to linear systems. These techniques, which allow powerful methods of analysis to be brought to bear upon all types of physical systems, also make extensive use of matrix methods.

This wide applicability of matrix methods has led to the development of specialized machine processes for the efficient performance of particular standard computations. These specialized machine processes often take the form of subroutines which are available as part of a program library at a computation center, and, as such, may be called by a program during its execution to perform the particular specialized function. Since these specialized processes will be widely used for a large variety of computational purposes, it is important that they be as efficient, that is as accurate and as fast, as possible. This means that their performance requirements must not exceed the limitations imposed by the fact that they are executed by a digital computer. In particular, inherent inaccuracies in these specialized processes must be anticipated and steps taken to compensate for them.

An inherent inaccuracy in the Gaussian elimination process as previously described arises because of the need to repetitively multiply the equations of system (1) by a fractional quantity such as that represented by equations (8) and (9). If the matrix form, equation (2), of system (1) is considered, it can be seen that the denominators of these fractional quantities are in all cases the diagonal elements of matrix A. These elements are thus commonly referred to as "pivots." The Gaussian elimination procedure becomes highly inaccurate in those cases in which the pivot elements are much smaller than the other elements. This phenomenon is well known and is discussed, for example, on page 34 of the previously cited text, *Computer Solution of Linear Algebraic Systems*. The system $$\begin{aligned} 0.000100\,x_1+1.00\,x_2&=1.00 \\ 1.00\,x_1+1.00\,x_2&=2.00 \end{aligned} \quad (20)$$

is there shown to have the true solution, rounded to five decimal places, $$\begin{aligned} x_1&=1.00010 \\ x_2&=0.99990 \end{aligned} \quad (21)$$

However, the solution that results from the straightforward application of Gaussian elimination is $$\begin{aligned} x_1&=0.00 \\ x_2&=1.00 \end{aligned} \quad (22)$$

This difficulty can be avoided by interchanging the rows of system (20) to produce the system of equations (23).

$$\begin{aligned} 1.00x_1+1.00x_2&=2.00 \\ 0.000100x_1+1.00x_2&=1.00 \end{aligned} \quad (23)$$

The pivot element is now seen to be 1.00 rather than 0.000100 with the result that the solution by Gaussian elimination is now $$\begin{aligned} x_1&=1.00 \\ x_2&=1.00 \end{aligned} \quad (24)$$

This procedure of interchanging rows so that the largest element of the column being eliminated is moved to the pivotal position is called partial pivoting.

Theoretically, partial pivoting will eliminate the inaccuracies in the Gaussian elimination if there is no round off. However, since all machine-implemented computations are carried out in finite precision arithmetic, there exist matrices for which partial pivoting will not produce a satisfactory answer. For these cases, the process of complete pivoting is required. Complete pivoting requires column as well as row interchanges to insure that the largest element of the entire unreduced portion of the matrix is moved to the pivotal position. Complete pivoting is always safe but suffers from the disadvantage of requiring $(n-k+1)^2$ comparisons at the $k^{th}$ step, as compared with only $n-k+1$ comparisons required by partial pivoting. Thus complete pivoting, while being more accurate, has a much slower execution time. Prior art computer programs that perform Gaussian elimination have thus either used complete pivoting and achieved accuracy at the expense of speed, or have used partial pivoting and achieved speed at the expense of accuracy.

It is an object of the present invention to provide a machine-implemented process of computation which is substantially as accurate as the complete pivoting process and as fast as the partial pivoting process.

It is a more specific object of this invention to provide a machine-implemented measure of the accuracy of the partial pivoting process at each step of the computation whereby an impending decrease in accuracy may be detected, enabling the remainder of the computation to be performed by the process of complete pivoting.

SUMMARY OF THE INVENTION

These objectives are achieved in accordance with the novel process of the present invention by initially utilizing the process of partial pivoting to perform Gaussian elimination. After each iteration of the partial pivoting process the quantity $$g^{(0)}+(n-1)h^{(k+1)} \qquad (25)$$

is computed, where $g^{(0)}$ represents the largest subdiagonal element of the matrix, $n$ represents the size of the matrix, and $h^{(k+1)}$ represents the largest superdiagonal element of the matrix at the $(k-1)^{st}$ step. The quantity of equation (25) is then compared to Φ, where $$\Phi = 8ng^{(0)} \qquad (26)$$

If the quantity (25) is less than or equal to , then partial pivoting is acceptable and computation may proceed. However, if for some $k$ the quantity of equation (25) is greater than , then the computation must switch to the method of complete pivoting to insure accurate results.

DETAILED DESCRIPTION

Figure 1:
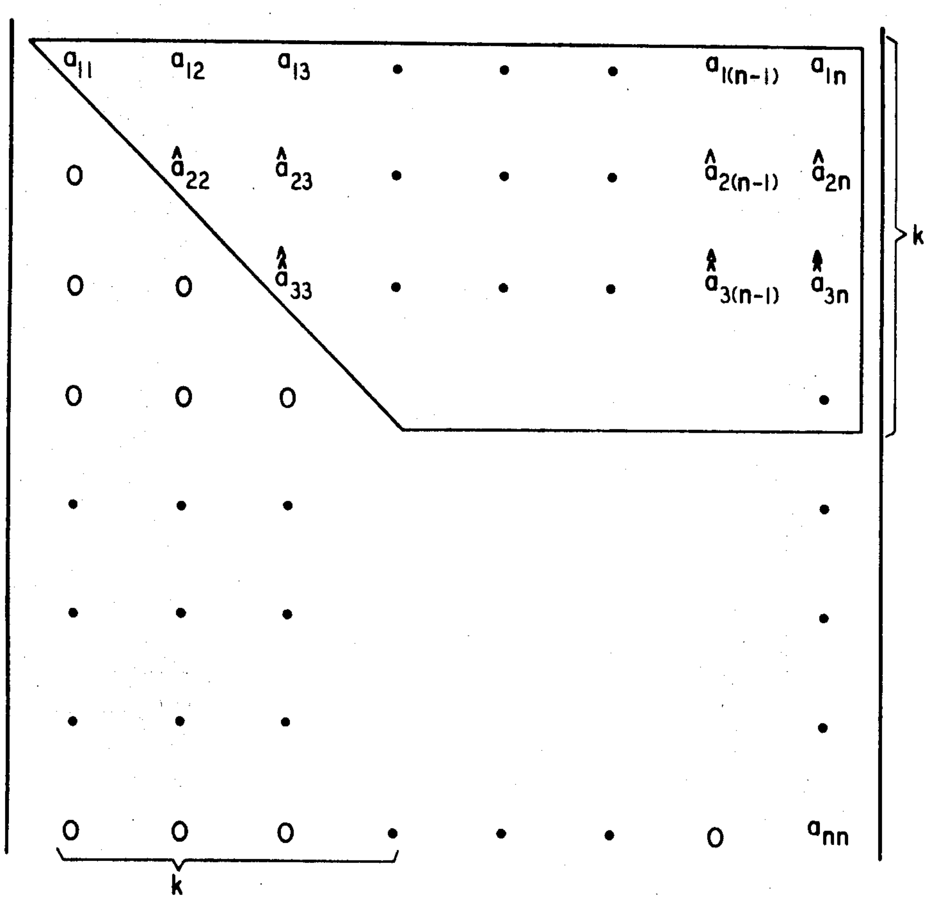
FIG. 1 is a graphical representation of a particular step in the novel process.

The machine-implemented measure of the accuracy of the partial pivoting process that comprises this invention can best be understood by a consideration of an error analysis of the partial pivoting process.

When the LU decomposition is performed on a digital computer, numerical inaccuracies such as rounding errors cause the actual value that is computed to be as shown in equation (27), $$LU=A+E \qquad (27)$$

in which the matrix $E$ represents the error. Accurate LU decomposition requires that this error be minimized. As discussed in chapter 21 of the previously recited reference, *Computer Solution of Linear Algebraic Systems*, the growth of the absolute values of the elements in the A matrix during the LU decomposition is a measure of the error. This growth may here be defined as:

$$g^{(k)} = \max_{\substack{0\le p\le k\\ 1\le i,j\le n}} |a_{ij}^{(p)}| \quad k=0,1,\ldots,n-1 \qquad (28)$$

That is, the growth, $g^{(k)}$, computed at the $k^{th}$ step represents the value of the maximum element of matrix A which has been encountered in the computation up to and including the $k^{th}$ step. It has been empirically determined that as long as the value of this growth at the $(n-1)^{st}$ step obeys the relationship, $$g^{(n-1)} \le 8g^{(0)} \qquad (29)$$

then the method of partial pivoting is accurate. When this relationship does not hold, then the method of complete pivoting must be used. This threshold is simultaneously low enough to insure numerical stability, that is, accuracy, and high enough to prevent premature shifting to the method of complete pivoting with the resultant loss in speed of computation. However, the test of equation (29) is not efficient since the computation of $g^{(n-1)}$ takes as long as the method of complete pivoting.

What is needed, then, is an indirect method of monitoring $g^{(n-1)}$ which is computationally efficient. The indirect method derived below is based on the observation that $g^{(n-1)}$ can be estimated in terms of $g^{(0)}$ and the largest superdiagonal element of $A^{(n-1)}$.

First, a new quantity, $h^{(k)}$, is defined as $$h^{(k)} = \max_{\substack{1\le p\le k+1\\ i<j\le n}} |a_{pj}^{(p)}| \qquad (30)$$

The significance of $h^{(k)}$ can be appreciated by means of FIG. 1. FIG. 1 shows a matrix in which $k-1$ steps of the Gaussian elimination procedure have been performed. It is seen that the elements below the diagonal in the first $k$ columns are all zero. Then $h^{(k)}$ represents the maximum value of the elements contained in the indicated trapezoidal area which includes a portion of the $k^{th}$ row.

The next step is to relate $h^{(k)}$ to the growth. The mathematical representation for the basic operation performed during the Gaussian elimination procedure is $$a_{ij}^{(k)} = a_{ik}^{(k-1)} - \frac{a_{kj}^{(k-1)}}{a_{kk}^{(k-1)}} a_{kj}^{(k-1)}, \; i,j=k+1,\, k+2, \ldots ,n \qquad (31)$$

Taking the absolute magnitude of each side of equation (31) yields $$|a_{ij}^{(k)}| = \left| a_{ij}^{(k-1)} - \frac{a_{ik}^{(k-1)}}{a_{kk}^{(k-1)}} a_{kj}^{(k-1)} \right| i,j=k+1,\, k+2, \ldots n \qquad (32)$$

Application of the well-known triangular inequalities to equation (32) gives $$|a_{ij}^{(k)}| \le |a_{ij}^{(k-1)}| + \left| \frac{a_{ik}^{(k-1)}}{a_{kk}^{(k-1)}} a_{kj}^{k-1)} \right| \qquad (33)$$

In the partial pivoting process row interchanges are made to insure that the largest element in a particular column is used as the pivot element. That is, at the $k^{th}$ step the relation $$|a_{kk}^{(k-1)}| \ge |a_{ik}^{(k-1)}| i=k+1, \ldots , n \qquad (34)$$

holds. Since absolute value signs are distributive in products and quotients, equation (34) may be expressed as $$\left| \frac{a_{ik}^{(k-1)}}{a_{kk}^{(k-1)}} \right| \le 1 \qquad (35)$$

Equation (35) may therefore be substituted in equation (33) without disturbing the validity of that equation to obtain $$|a_{ij}^{(k)}| \leq |a_{ij}^{(k-1)}| + |_{kj}^{(k-1)}| i,\ j=k+1,\ k+2,\ \ldots\ n. \qquad (36)$$

Taking the maximum values of both sides of this equation yields $$\max_{\substack{0\leq p\leq k\\ 1\leq i,\ j\leq n}} |a_{ij}^{(p)}| \leq \max_{\substack{0\leq p\leq k-1\\ i\leq i,j\leq n}} |a_{ij}^{(p)}| + \max_{\substack{1\leq p\leq k\\ i<j\leq n}} |_{pj}^{(p)}| \qquad (37)$$

Substituting equations (28) and (30) into equation (37) yields $$g^{(k)} \leq g^{(k11)}+h^{(k11)} \qquad (38)$$

By induction, this reduces to $$g^{(k)} \leq g^{(0)}+kh^{(k11)} \qquad (39)$$

Since the maximum value of $k$ is $n-1$ , this value may be substituted for the coefficient of $h^{(k11)}$ in equation (39) without changing the validity of that inequality, thereby obtaining equation (40).

$$g^{(k)} \leq g^{(0)}+(n-1)h^{(k11)} \qquad (40)$$

Recalling that the quantity $g^{(n11)}$ represents the value of the maximum element of matrix A which has been encountered in the computation up to and including the $(n-1)^{st}$ step, it is seen that the right-hand side of equation (40) is the sum of $n$ quantities, each of which, by definition, must be less than or equal to $g^{(n11)}$. Then the upper bound of the right-hand side of equation (40) is as shown in equation (41).

$$g^{(k)} \leq g^{(0)}+(n-1)h^{(k11)} \leq ng^{(n11)} \qquad (41)$$

Considering equation (41) for $k=n-1$, it is seen that the quantity $g^{(0)}+(n-1)h^{(k11)}$, which may be termed the indirect measure, is greater than $g^{(n11)}$ and less than $ng^{(n11)}$. The indirect measure of equation (41) is easy to compute, and if this quantity can be related to the threshold of equation (29), the desired indirect method of monitoring $g^{(n11)}$ will have been found.

The threshold of equation (29) cannot be used as a threshold for the indirect measure because, as shown in equation (41), the indirect measure may assume a value as large as $ng^{(n-1)}$ and equation (29) bounds $g^{(n-1)}$, not $ng^{(n-1)}$. The threshold used for the indirect measure must then be at least $8ng^{(0)}$ This implies that the use of the indirect measure will delay the switchover from the method of partial pivoting to the method of complete pivoting until the relationship $$g^{(n11)} \leq 8ng^{(0)} \qquad (42)$$

has been violated. This means that the method of partial pivoting will be employed for a longer period of time than if the test of equation (29) were actually being used, resulting in a loss of accuracy. The use of the higher threshold of equation (42) introduces an error which may be, at most, $\log_{10}8$ decimal places. This loss of accuracy, which amounts to only a single decimal digit, is the cost that is paid for a doubling in computation speed over the method of complete pivoting. It is important to note that this loss of accuracy is independent of both the size of the matrix and the number of significant digits being used.

Equation (43)

$$g^{(0)}+(n-1)h^{(k11)} \leq 8ng^{(0)} \qquad (43)$$

thus represents a computationally efficient indirect method of monitoring the growth. The quantity $g^{(0)}$ represents the largest value initially contained in matrix A and thus does not change during the entire course of computation. The size of the matrix, represented by $n$, is also a constant during the course of computation. The quantity $h^{(k11)}$ represents, at the $k^{th}$ step, the largest value contained in the trapezoidal area shown in FIG. 1. The current value of $h$ is computed at each step of the process by a simple search in which the largest value in the current pivotal row is compared to the largest value which was previously encountered, and the larger of these two is stored. When the test of equation (43) fails, the switch to the method of complete pivoting can be made immediately without restarting the entire computation. When this occurs, the remainder of the computation must, of course, be performed by the method of complete pivoting, and therefore further computation of the value of $h$ need not occur.

The novel process comprising this invention is described by the digital computer program listing shown in the appendix. This program listing, written in FORTRAN IV, is a description of the set of electrical control signals that serve to reconfigure a suitable general purpose digital computer into a novel machine capable of performing the invention. The steps performed by the novel machine on these electrical control signals in the general purpose digital computer comprises the best mode contemplated to carry out the invention.

A general purpose digital computer suitable for being transformed into the novel machine needed to perform the novel process of this invention is an IBM System 360 Model 65 computer equipped with the OS/360 FORTRAN IV compiler as described in the IBM manual. *IBM System /360 FORTRAN IV Language—Form* C28-6515-7. Another example is the GE-635 computer equipped with the GECOS FORTRAN IV compiler as described in the *GE* 625/635 *FORTRAN IV Reference Manual, CPB*-1006*G*.

It can be seen that the program listing in the appendix has the form of a subroutine. As previously discussed, the novel process of this invention is most suitably practiced as a subroutine, which may be called by any program that requires the decomposition of an N×N matrix.

Figure 2B:
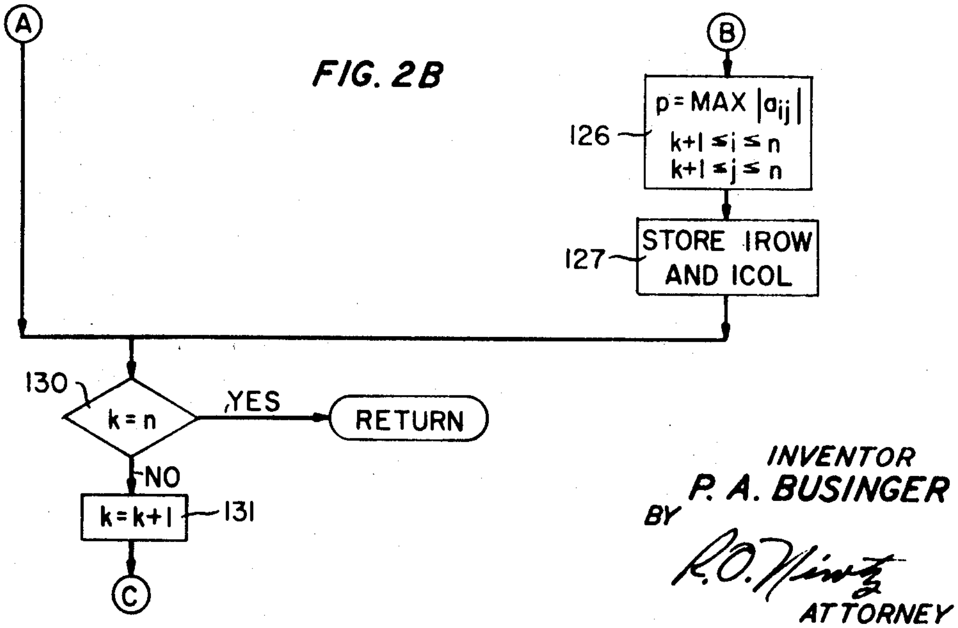
FIGS. 2A and 2B are flow charts which illustrate the sequence of steps of the novel process.
Figure 2A:
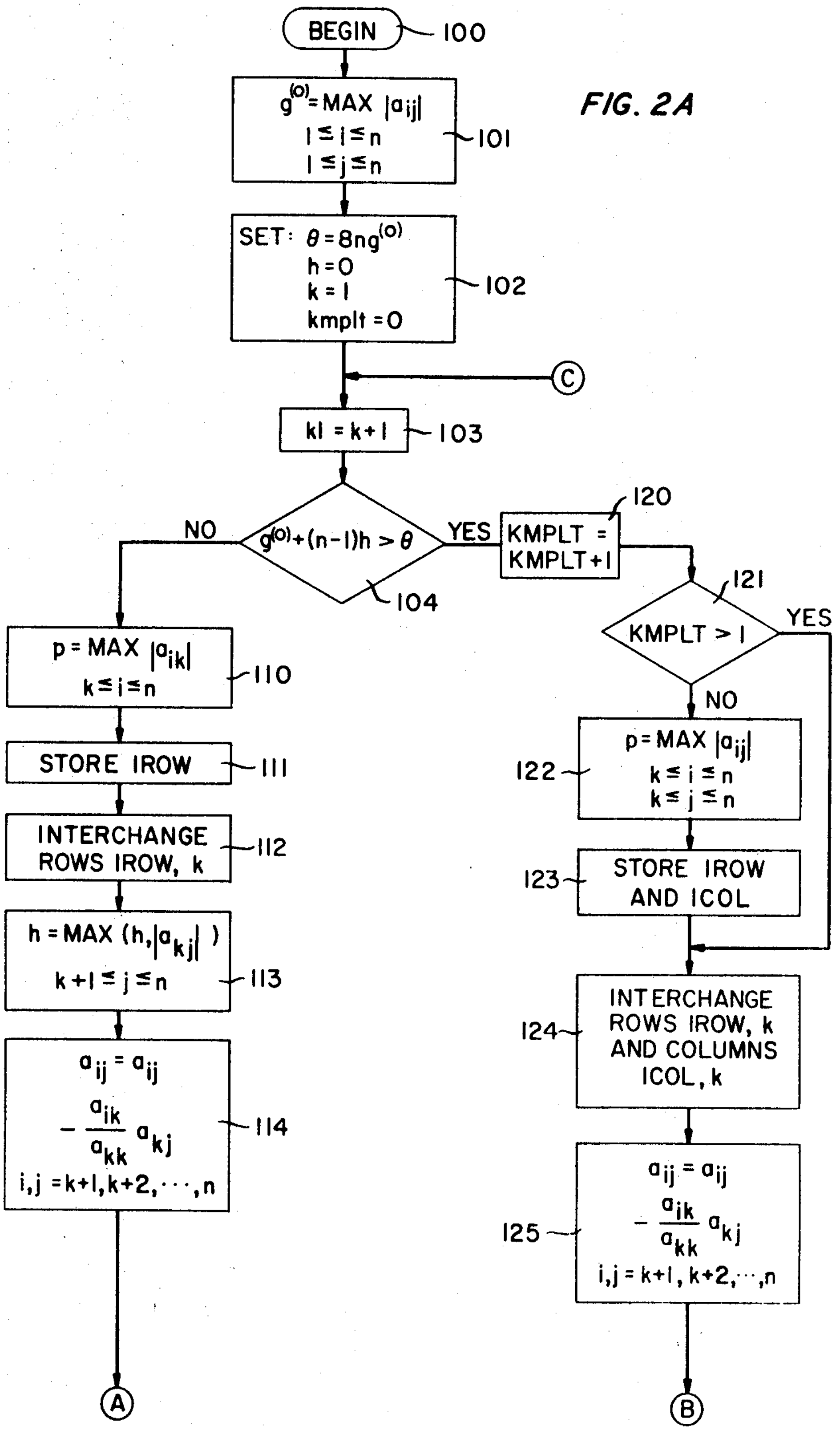

The program listing, which has been extensively commented, is more readily understood with the aid of the flow charts of FIGS. 2A and 2B. The flow charts can be seen to include four different symbols. The oval symbols are terminal indicators and signify the beginning and end of the subroutine. The rectangles, termed "operation blocks," contain the description of a particular detailed operational step of the process. The diamond-shaped symbols, termed "conditional branch points," contain a description of a test performed by the computer to enable it to choose the next step to be performed. The circles are used merely as a drawing aid to provide continuity between figures.

As shown in the flow chart of FIG. 2A, the subroutine, herein called L1U, is entered at block 100. The first operation, block 101, is the determination of $g^{(0)}$, the largest element in the initial matrix. Operation block 102 sets some internal flags to zero and computes the threshold, . Operation block 103 increments an internal counter. Conditional branch point 104 applies the indirect measure of equation (43) to determine whether to proceed with partial pivoting or complete pivoting.

If the indirect measure is not larger than , conditional branch point 104 passes control to operation block 110. Blocks 110–112 find the row that contains the largest element in the column currently being eliminated and shift it into the pivotal row position. Block 113 updates the value of $h$. Block 114 then performs the Gaussian elimination step according to equation (31) and passes control to conditional branch point 130, shown in FIG. 2B.

If the indirect measure is larger than , conditional branch point 104 passes control to operation block 120. This block sets a flag, KMPLT. This flag is tested in conditional branch point 121. If KMPLT is not greater than 1, then this is the first pass through the complete pivoting process and the pivot element, $p$, is found by searching the remaining columns and rows, including the current or $k^{th}$ column and row. Blocks 123 and 124 serve to bring the pivotal element into the pivotal position. Block 125 then performs the Gaussian elimination step according to equation (31). Blocks 126 and 127, shown in FIG. 2B, then compute the new pivotal element and its current position and pass control to conditional branch point 130.

Conditional branch point 130 determines whether the entire matrix has been processed. If so, it returns control to the calling program. If not, block 131 increments the internal counter and returns control to block 103. The branch of the flow chart comprising the complete pivoting process, that is blocks 120–137, does not change the value of $h$, and hence once conditional branch block 104 passes control to branch 120–127, it will continue to do so for each succeeding iteration until the computation has been completed. This is in accordance with the requirement that once the process shifts to the method of complete pivoting, this method must be used for the remainder of the computation to insure accuracy.

What is claimed is:

1. The machine method of solving a system of linear equations by the matrix technique of Gaussian elimination comprising the steps of:

performing said elimination utilizing partial pivoting;

monitoring the growth of the matrix for each elimination; and completing said elimination by complete pivoting when said growth exceeds a preselected threshold.

2. The method of operating a digital computer adapted to perform arithmetic operations on numbers expressed in terms of words so as to perform the process of Gaussian elimination upon an $n \times n$ matrix comprising the steps of:

causing said computer to perform said Gaussian elimination process by the method of partial pivoting;

causing said computer to determine the growth of said matrix after each step of said partial pivoting process;

causing said computer to compare said growth to a predetermined threshold; and causing said computer to continue said Gaussian elimination process said predetermined threshold and to continue said Gaussian elimination process by the method of complete pivoting if said growth does not exceed said predetermined threshold.

3. The method of claim 2 wherein said method of determining said growth comprises causing said computer to compute the value of $g^{(0)}+(n-1)h^{(k11)}$ where $n$ is the size of said matrix, $g^{(0)}$ is the magnitude of the largest element initially present in said matrix, $h^{(k11)}$ is the largest superdiagonal element of said matrix at the $(k-1)^{st}$ step, and $k$ is a variable running from zero to $n-1$.

4. The method of claim 3 wherein said predetermined threshold comprises $8ng^{(0)}$ where $n$ is the size of said matrix and $g^{(0)}$ is the magnitude of the largest element initially present in said matrix.

5. The machine-implemented process of performing Gaussian elimination upon an $n \times n$ matrix using the machine-implemented process of partial pivoting until numerical instability develops, at which time the machine-implemented process of complete pivoting is used, wherein the improvement comprises:

computing the value of $V=g^{(0)}+(n-1)h^{(k11)}$ at the end of each step of said machine-implemented process of partial pivoting, where $n$ is the size of said matrix, $g^{(0)}$ is the magnitude of the largest element initially present in said matrix, $h^{(k11)}$ is the largest superdiagonal element of said matrix at the $(k-1)^{st}$ step, and $k$ is a variable running from zero to $n-1$;

comparing said computer value of $V$ with $=8ng^{(0)}$;

and continuing said Gaussian elimination by using said process of partial pivoting if $V>$ and by using said process of complete pivoting if $V\leq$ .

6. A machine-implemented process of performing Gaussian elimination upon an $n \times n$ matrix comprising the steps of:

programming a digital computer to allow it to perform Gaussian elimination by the method of partial pivoting;

programming a digital computer to allow it to perform Gaussian elimination by the method of complete pivoting;

programming a digital computer to begin said machine-implemented process of Gaussian elimination by performing said method of partial pivoting upon said $n \times n$ matrix;

programming a digital computer to compute the value of $V=g^{(0)}+(n-1)h^{(k11)}$ at the end of each step of said process of partial pivoting where $n$ is the size of said matrix, $g^{(0)}$ is the magnitude of the largest element initially present in said matrix, $h^{(k11)}$ is the largest superdiagonal element of said matrix at the $(k-1)^{st}$ step, and $k$ is a variable running from zero to $n-1$;

programming a digital computer to compare said computer value of $V$ with $=8ng^{(0)}$; and programming a digital computer to continue said Gaussian elimination by using said process of partial pivoting if $V>$ and by using said process of complete pivoting if $V\leq$ .

7. The machine method of performing the process of Gaussian elimination upon an $n \times n$ matrix comprising the steps of:

performing said Gaussian elimination process by the method of partial pivoting;

determining the value of the growth of said matrix after each step of said partial pivoting process;

comparing said value of growth to a predetermined threshold; and continuing said Gaussian elimination process by the method of partial pivoting if said value of growth exceeds said predetermined threshold and continuing said Gaussian elimination process by the method of complete pivoting if said value of growth does not exceed said predetermined threshold.

8. The method of claim 7 wherein said step of determining said value of growth comprises:

computing the value of $g^{(0)}+(n-1)h^{(k11)}$ where $n$ is the size of said matrix, $g^{(0)}$ is the magnitude of the largest element initially present in said matrix, $h^{(k11)}$ is the largest superdiagonal element of said matrix at the $(k-1)^{st}$ step, and $k$ is a variable running from zero to $n-1$.

9. The method of claim 8 wherein said predetermined threshold comprises $8ng^{(0)}$ where $n$ is the size of said matrix and $g^{(0)}$ is the magnitude of the largest element initially present in said matrix.

10. The machine method of performing the process of Gaussian elimination upon an $n \times n$ matrix comprising the steps of:

performing Gaussian elimination by the method of partial pivoting:

computing the value of $g^{(0)}+(n-1)h^{(k11)}$ at the end of each step of said method and said partial pivoting where $n$ is the size of said matrix, $g^{(0)}$ is the magnitude of the largest element initially present in said matrix, $h^{(k11)}$ is the largest superdiagonal element of said matrix at the $(k-1)^{st}$ step, and $k$ is a variable running from zero to $n-1$;

computing said computer value to the threshold value $Sng^{(0)}$; and continuing the Gaussian elimination process by using the process of partial pivoting if said computed value is greater than said threshold value and by using the process of complete pivoting if said computed value is less than or equal to said threshold value.

UNITED STATES PATENT OFFICE
CERTIFICATE OF CORRECTION

Patent No. 3,621,209 Dated November 16, 1971

Inventor(s) Peter A. Businger

It is certified that error appears in the above-identified patent and that said Letters Patent are hereby corrected as shown below:

Column 2, line 70, "$x_{11}$" should read --$x_{n-1}$--.
Column 3, Equation (14), that portion of the equation reading $$\begin{bmatrix} k_1 \\ k_2 \\ k_3 \\ \cdot \\ \cdot \\ \cdot \\ k_n^{(n-1)} \end{bmatrix} \text{ should read } \begin{bmatrix} k_1 \\ \hat{k}_2 \\ \hat{\hat{k}}_3 \\ \cdot \\ \cdot \\ \cdot \\ \hat{k}_n^{(n-1)} \end{bmatrix}$$

Also in column 3, line 28, Equation (15) should read--$LU\underline{x}=\underline{k}$--; line 42, "$A^{11}$" should be --$A^{-1}$--; line 68, "$A^{11}$" should be --$A^{-1}$--. Column 5, that portion of Equation (25) which reads "$h^{(k11)}$" should be --$h^{(k-1)}$--; line 44 "$h^{(k11)}$" should read --$h^{(k-1)}$--; line 48 after "to" insert --$\Phi$--; line 51, before the comma insert --$\Phi$--. Column 6, that portion of Equation (29) which reads "$g^{(n11)}$" should read --$g^{(n-1)}$--; line 21, "$g^{(n11)}$" should be --$g^{(n-1)}$--; line 24, "$g^{(n11)}$" should be --$g^{(n-1)}$--; line 25, "$g^{(n11)}$" should be --$g^{(n-1)}$--; line 27, "$A^{(n11)}$" should be --$A^{(n-1)}$--; Equation (31) after the first equal sign "$a_{ik}^{(k-1)}$" should be --$a_{ij}^{(k-1)}$--; after the minus sign

UNITED STATES PATENT OFFICE
CERTIFICATE OF CORRECTION

Patent No. 3,621,209 Dated November 16, 1971

Inventor(s) Peter A. Businger

It is certified that error appears in the above-identified patent and that said Letters Patent are hereby corrected as shown below:

"$\frac{a_{kj}^{(k-1)}}{a_{kk}^{(k-1)}}$" should read -- $\frac{a_{ik}^{(k-1)}}{a_{kk}^{(k-1)}}$ --. Column 7, Equation (36), after the plus sign "$\left|{}_{kj}^{(k-1)}\right|$" should read -- $\left|a_{kj}^{(k-1)}\right|$ --; at the end of Equation (37) the group "$\left|{}_{pj}^{p}\right|$" should read --$\left|a_{pj}^{p}\right|$--; Equation (38) should read --$g^{(k)}\leq g^{(k-1)}+h^{(k-1)}$--; Equation (39), after the plus sign "$kh^{(kll)}$" should read --$kh^{(k-1)}$--; line 18, "$h^{(kll)}$" should read --$k^{(k-1)}$--; line 21, Equation (40), "$h^{(kll)}$" should read --$h^{(k-1)}$--, at the end of the line "$g^{(nll)}$" should read --$g^{(n-1)}$--; line 26, "$g^{(nll)}$" should read --$g^{(n-1)}$--; line 29, Equation (41), "$h^{(kll)}$" should read --$h^{(k-1)}$--, "$ng^{(nll)}$" should read --$ng^{(n-1)}$--; line 31, "$h^{(kll)}$" should read --$h^{(k-1)}$--; line 32, "$g^{(nll)}$" should read --$g^{(n-1)}$-- and "$ng^{(nll)}$" should read --$ng^{(n-1)}$--; line 45, "$g^{(nll)}$" should read --$g^{(n-1)}$--; line 45, Equation (42), "$g^{(nll)}$" should read --$g^{(n-1)}$--; line 58, Equation (43), "$h^{(kll)}$" should read --$h^{(k-1)}$--; line 64, "$h^{(kll)}$" should read --$h^{(k-1)}$--. Column 8, line 2, after "in" insert --pages 19 and 20 of--; line 40, after "threshold," insert --$\Phi$--; line 45, after "than" and before the comma, insert --$\Phi$--; line 53, after "than" insert --$\Phi$--. Column 9, between line 2 and "What is claimed is" insert the attached Appendix pages 19 and 20; line 24, claim 2, after

UNITED STATES PATENT OFFICE
CERTIFICATE OF CORRECTION

Patent No. 3,621,209 Dated November 16, 1971

Inventor(s) Peter A. Businger

It is certified that error appears in the above-identified patent and that said Letters Patent are hereby corrected as shown below:

"process" insert --by the method of partial pivoting if said growth exceeds--; line 30, claim 3, "$h^{(kll)}$" should read --$h^{(k-1)}$--; line 32, "$h^{(kll)}$" should read --$h^{(k-1)}$--; line 46, claim 5, "$h^{(kll)}$" should read --$h^{(k-1)}$--; line 50, "$h^{(kll)}$" should read --$h^{(k-1)}$--; line 53, before the equal sign insert --$\Phi$--; line 55, "$V>$" should read --$V>\Phi$--; line 56, "$V\leq$" should read --$V\leq\Phi$--. Column 10, claim 6, line 6, "$h^{(kll)}$" should read --$h^{(k-1)}$--; line 9, "$h^{(kll)}$" should read --$h^{(k-1)}$--; line 12, "computer" should read --computed--; line 13, before the equal sign insert --$\Phi$--; line 15, "$V>$" should read --$V>\Phi$--; line 14, "$V\leq$" should read --$V\leq\Phi$--; line 34, claim 8, "$h^{(kll)}$" should read --$h^{(k-1)}$--; line 36, "$h^{(kll)}$" should read --$h^{(k-1)}$--; line 49, claim 10, "$h^{(kll)}$" should read --$h^{(k-1)}$--; line 52, "$h^{(kll)}$" should read --$h^{(k-1)}$--; line 55, change "computer" to --computed--.

Attached
Pages 19 and 20

ORM PO-1050 (10-69)

USCOMM-DC 60376-P69

```
C
C ELIMINATION WITH COMPLETE PIVOTING
C
C          SEARCH FOR PIVOT (FIRST TIME ONLY)
   70      KMPLT=KMPLT+1
           IF(KMPLT.GT.1)GOTO 100
           P=0.E0
           DO 90 I=K,N
              DO 80 J=K,N
                 IF(P.GE.ABS(A(I,J)))GOTO 80
                 P=ABS(A(I,J))
                 IROW=I
                 ICOL=J
   80            CONTINUE
   90         CONTINUE
  100      IR(K)=IROW
           IC(K)=ICOL
C          ROW- AND COLUMN-INTERCHANGE
           IF(IROW.EQ.K)GOTO 120
           DO 110 J=1,N
              T=A(IROW,J)
              A(IROW,J)=A(K,J)
  110         A(K,J)=T
  120      IF(ICOL.EQ.K)GOTO 140
           DO 130 I=1,N
              T=A(I,ICOL)
              A(I,ICOL)=A(I,K)
  130         A(I,K)=T
C          ELIMINATION (WITH SEARCH)
  140      P=0.E0
           DO 160 I=K1,N
              T=A(I,K)/A(K,K)
              A(I,K)=T
              DO 150 J=K1,N
                 A(I,J)=A(I,J)-T*A(K,J)
                 IF(P.GE.ABS(A(I,J)))GOTO 150
                 P=ABS(A(I,J))
                 IROW=I
                 ICOL=J
  150            CONTINUE
  160         CONTINUE
C
  170      CONTINUE
        IR(N)=N
        IC(N)=N
        RETURN
        END
```

```
      SUBROUTINE L1U(A,NMAX,N,IR,IC)
      REAL A(NMAX,1)
      INTEGER IR(1),IC(1)
C
C L1U USES GAUSSIAN ELIMINATION WITH PARTIAL PIVOTING TO DECOM-
C POSE THE N BY N  (N.GE.2) NONSINGULAR MATRIX A INTO THE PRO-
C DUCT OF A UNIT LOWER TRIANGULAR MATRIX AND AN UPPER TRIANG-
C ULAR MATRIX. IN CASE OF ALARMING GROWTH OF INTERMEDIATE RE-
C SULTS, THE PROGRAM SWITCHES TO COMPLETE PIVOTING. UPON RE-
C TURN, THE VECTORS IR AND IC CONTAIN THE ROW- AND COLUMN- SUB-
C SCRIPTS OF A IN THE ORDER CHOSEN DURING THE ELIMINATION.
C
C     COMPUTE G0,THETA, INITIALIZE H,KMPLT
      G0=0.E0
      DO 10 I=1,N
         DO 10 J=1,N
   10       G0=AMAX1(G0,ABS(A(I,J)))
      THETA=FLOAT(8*N)*G0
      H=0.E0
      KMPLT=0
C
      N1=N-1
      DO 170 K=1,N1
         K1=K+1
C        MONITOR H
         IF(G0+FLOAT(N1)*H.GT.THETA)GOTO 70
C
C ELIMINATION WITH PARTIAL PIVOTING
C
C        SEARCH FOR PIVOT
         P=0.E0
         DO 20 I=K,N
            IF(P.GE.ABS(A(I,K)))GOTO 20
            P=ABS(A(I,K))
            IROW=I
   20       CONTINUE
         IR(K)=IROW
         IC(K)=K
C        ROW INTERCHANGE
         IF(IROW.EQ.K)GOTO 40
         DO 30 J=1,N
            T=A(IROW,J)
            A(IROW,J)=A(K,J)
   30       A(K,J)=T
C        UPDATE H
   40    DO 50 J=K1,N
   50       H=AMAX1(H,ABS(A(K,J)))
C        ELIMINATION (WITHOUT SEARCH)
         DO 60 I=K1,N
            T=A(I,K)/A(K,K)
            A(I,K)=T
            DO 60 J=K1,N
   60          A(I,J)=A(I,J)-T*A(K,J)
         GOTO 170
```

UNITED STATES PATENT OFFICE
CERTIFICATE OF CORRECTION

Patent No. 3,621,209 Dated November 16, 1971

Inventor(s) Peter A. Businger PAGE - 4

It is certified that error appears in the above-identified patent and that said Letters Patent are hereby corrected as shown below:

Signed and sealed this 27th day of June 1972.

(SEAL)
Attest:

EDWARD M.FLETCHER,JR.
Attesting Officer

ROBERT GOTTSCHALK
Commissioner of Patents